United States Patent
Kamiya et al.

(10) Patent No.: US 6,928,829 B2
(45) Date of Patent: Aug. 16, 2005

(54) VEHICLE AIR CONDITIONER WITH SEAT AIR CONDITIONING UNIT

(75) Inventors: Toshifumi Kamiya, Takahama (JP); Shinji Aoki, Chiryu (JP)

(73) Assignee: Denso Corporation, Kariya (JP)

( * ) Notice: Subject to any disclaimer, the term of this patent is extended or adjusted under 35 U.S.C. 154(b) by 4 days.

(21) Appl. No.: 10/753,222

(22) Filed: Jan. 7, 2004

(65) Prior Publication Data

US 2004/0139754 A1 Jul. 22, 2004

(30) Foreign Application Priority Data

Jan. 10, 2003 (JP) ........................................ 2003-004301

(51) Int. Cl.[7] .............................................. F25D 23/12
(52) U.S. Cl. ...................... 62/244; 62/261; 297/452.42; 454/907
(58) Field of Search .......................... 62/244, 3.5, 3.61, 62/261; 297/180.14, 452.42, 452.43, 452.44, 452.45, 452.46, 452.47; 454/120, 907

(56) References Cited

U.S. PATENT DOCUMENTS

| | | | | |
|---|---|---|---|---|
| 3,550,523 A | * | 12/1970 | Segal | 454/120 |
| 5,715,695 A | * | 2/1998 | Lord | 62/259.3 |
| 5,921,100 A | * | 7/1999 | Yoshinori et al. | 62/244 |
| 6,059,018 A | * | 5/2000 | Yoshinori et al. | 165/42 |
| 6,079,485 A | * | 6/2000 | Esaki et al. | 165/43 |
| 6,179,706 B1 | * | 1/2001 | Yoshinori et al. | 454/120 |
| 6,224,150 B1 | * | 5/2001 | Eksin et al. | 297/180.1 |
| RE38,128 E | * | 6/2003 | Gallup et al. | 62/3.5 |
| 6,722,148 B2 | * | 4/2004 | Aoki et al. | 62/244 |

* cited by examiner

Primary Examiner—William E. Tapolcai
(74) Attorney, Agent, or Firm—Harness, Dickey & Pierce, PLC

(57) ABSTRACT

In a seat air conditioning unit for a vehicle seat constructed with a seat cushion and a seat back, when a seat air conditioning operation is performed in a cooling operation of a passenger compartment, a cooling capacity of cool air blown from the seat back is set smaller than a cooling capacity of cool air blown from these at cushion while a passenger sits on the vehicle seat. Further, the cooling capacity of cool air blown from a lower portion of the seat back can be set smaller than the cooling capacity of an upper portion of the seat back. Accordingly, even when the cooling operation is continued for a long time while the seat air conditioning operation is performed, the waist portion of the passenger can be prevented from being excessively cooled.

18 Claims, 11 Drawing Sheets

VEHICLE AIR CONDITIONER WITH SEAT AIR CONDITIONING UNIT

CROSS-REFERENCE TO RELATED APPLICATION

This application is related to Japanese Patent Application No. 2003-4301 filed on Jan. 10, 2003, the content of which is hereby incorporated by reference.

BACKGROUND OF THE INVENTION

1. Field of the Invention

The present invention relates to a vehicle air conditioner with a seat air conditioning unit capable of blowing cool air from surfaces of a seat cushion and a seat back of a vehicle seat on which a passenger (user) sits. More particularly, the present invention relates to a cooling capacity control of air blown from the seat cushion and a cooling capacity control of air blown from the seat back. Here, the cooling capacity includes at least one of an air temperature and an air amount blown from the seat cushion or the seat back of the vehicle seat.

2. Description of Related Art

As shown in FIG. 14, in a seat air conditioning unit for a vehicle disclosed in U.S. Pat. No. 6,179,706 (corresponding to JP-A-2000-152849), a vehicle seat includes a seat cushion J1 for receiving the hip portion and the thigh portion of a passenger sitting on the vehicle seat, a seat back J2 for receiving the waist portion and the shoulder portion of the passenger, and a common blower J3. The air conditioning unit is constructed so that cool air blown by the common blower J3 is distributed to the seat cushion J1 and the seat back J2.

However, when the passenger sits on the vehicle seat (J1, J2) for a long time while this seat air conditioning unit operates during a cooling operation of a passenger compartment, the waist portion of the passenger maybe excessively cooled, and the passenger may have lumbago. Further, when the passenger sits on the vehicle seat (J1, J2), many of air outlets of the seat cushion J1 are closed by the hip portion (buttock portion) and the thigh portion of the passenger. Therefore, cooling capacity of air blown from the seat back J2 is increased. In this case, the waist portion of the passenger may be excessively cooled.

SUMMARY OF THE INVENTION

In view of the above problems, it is an object of the present invention to provide a vehicle air conditioner with a seat air conditioning unit capable of preventing the waist portion of a passenger from being excessively cooled when the seat air conditioning unit operates for a long time in a cooling operation.

According to an aspect of the present invention, a vehicle air conditioner includes a seat air conditioning unit for a vehicle seat that is constructed of a seat cushion for receiving the hip portion of a passenger sitting on the vehicle seat and a seat back for receiving the waist portion and the shoulder portion of the passenger, and an electronic control unit for controlling the seat air conditioning unit. The seat air conditioning unit includes a cushion blowing means provided in the seat cushion for blowing air from a surface of the seat cushion to the hip portion of the passenger, and a back blowing means provided in the seat back independently from the cushion blowing means, for blowing air from a surface of the seat back to the waist portion and the shoulder portion of the passenger. In the vehicle air conditioner, the electronic control unit controls the cushion blowing means and the back blowing means in such a manner that a cooling capacity of air blown from the seat back is smaller than a cooling capacity of air blown from the seat cushion while the passenger sits on the vehicle seat, after a seat cooling operation for blowing cool air from the vehicle seat is selected by the passenger. Accordingly, even when cooling operation of the passenger compartment is continued for a long time while the seat air conditioning operation is selected, the waist portion of the passenger can be prevented from being excessively cooled. Further, comfortable cooling feeling can be given to the passenger by the cool air blown from the seat cushion.

Preferably, the electronic control unit has a passing-time determination means for determining whether a predetermined time passes after the seat cooling operation is started. In this case, when the passing-time determination means determines that the predetermined time passes after the seat cooling operation is started, the electronic control unit controls the cushion blowing means and the back blowing means in such a manner that the cooling capacity of air blown from the seat back is smaller than the cooling capacity of air blown from the seat cushion while the passenger sits on the vehicle seat. Thus, even when the seat cooling operation is performed for a long time, comfortable seat cooling can be given to the passenger on the vehicle seat.

According to an another aspect of the present invention, the seat air conditioning unit includes a cushion air passage provided in the seat cushion through which air is blown from a surface of the seat cushion toward the hip portion of the passenger on the vehicle seat, a back air passage provided in the seat back through which air is blown from a surface of the seat back toward the shoulder portion and the waist portion of the passenger sitting on the vehicle seat, a cushion fan provided in the seat cushion for blowing air in the cushion air passage to the surface of the seat cushion, and a back fan provided in the seat back independently from the cushion fan for blowing air in the back air passage to the surface of the seat back. In the vehicle air conditioner, the electronic control unit controls the cushion fan and the back fan so that an amount of air blown from the seat back to be smaller than an amount of air blown from the seat cushion while the passenger sits on the vehicle seat, after the seat cooling operation for blowing cool air from the vehicle seat is selected by the passenger.

Preferably, the back air passage includes an upper passage portion through which air is blown by the back fan from a first surface portion of the seat back for receiving shoulder portion of the passenger sitting on the vehicle seat, and a lower passage portion through which air is blown by the back fan from a second surface portion of the seat back for receiving the waist portion of the passenger. Here, the first surface portion is positioned higher than the second surface portion in the seat back. In this case, the electronic control unit controls the amount of air blown from the second surface portion of the seat back to be smaller than the amount of air blown from the surface of the seat cushion, and to be smaller than an amount of air blown from first surface portion of the seat back.

More preferably, the back fan includes a first fan portion disposed in the upper passage portion for blowing air from the first surface portion of the seat back, and a second fan portion disposed in the lower passage portion for blowing air from the second surface portion of the seat back. In this case, the electronic control unit controls the first fan portion and the second fan portion in such a manner that the amount of air blown from the second surface portion of the seat back is smaller than the amount of air blown from first surface portion of the seat back in the seat cooling operation.

Alternatively, the upper passage portion of the back air passage includes a first communication passage communicated with a discharge side of the back fan, and a first distribution passage through which air introduced into the first communication passage is supplied to the first surface portion of the seat back. Similarly, the lower passage portion of the back air passage includes a second communication passage communicated with the discharge side of the back fan, and a second distribution passage through which air introduced into the second communication passage is supplied to the second surface portion of the seat back. In this case, a damper for controlling an opening area of the second communication passage is provided, and the electronic control unit controls the damper to reduce the opening area of the second communication passage in the seat cooling operation. Even in this case, the amount of air blown from the second surface portion of the seat back can be made smaller than the amount of air blown from first surface portion of the seat back in the seat cooling operation.

The seat air conditioning unit can be drawn inside air of the passenger compartment and can blown the drawn inside air from the surface of the vehicle seat. Alternatively, the seat air conditioning unit can be directly drawn conditioned air of an interior air conditioning unit for blowing conditioned air into the passenger compartment. In this case, the seat air conditioning unit blows the conditioned air of the interior air conditioning unit from the surface of the vehicle seat.

According to a further another aspect of the present invention, the electronic control unit includes a first calculation means for calculating a control value of the interior air conditioning unit based on an air temperature in the passenger compartment and a set air temperature in the passenger compartment set by the passenger, and a second calculation means for calculating a control value of the seat cushion and a control value of the seat back based on the calculated control value of the interior air conditioning unit and a seat set temperature set by the passenger. Here, the control value is smaller as the cooling capacity becomes larger. The electronic control unit further includes a control-value determination means for determining whether the calculated control value of the seat back is smaller than a predetermined control value, and a change means which changes the control value of the seat back to be equal to or larger than the predetermined control value for reducing the cooling capacity of the seat back when the control-value determination means determines that the calculated control value of the seat back is smaller than the predetermined control value. Thus, the electronic control unit readily controls the cooling capacity of air blown from the seat back to be smaller than the cooling capacity of air blown from the seat cushion of the vehicle seat.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

(First Embodiment)

Figure 2:
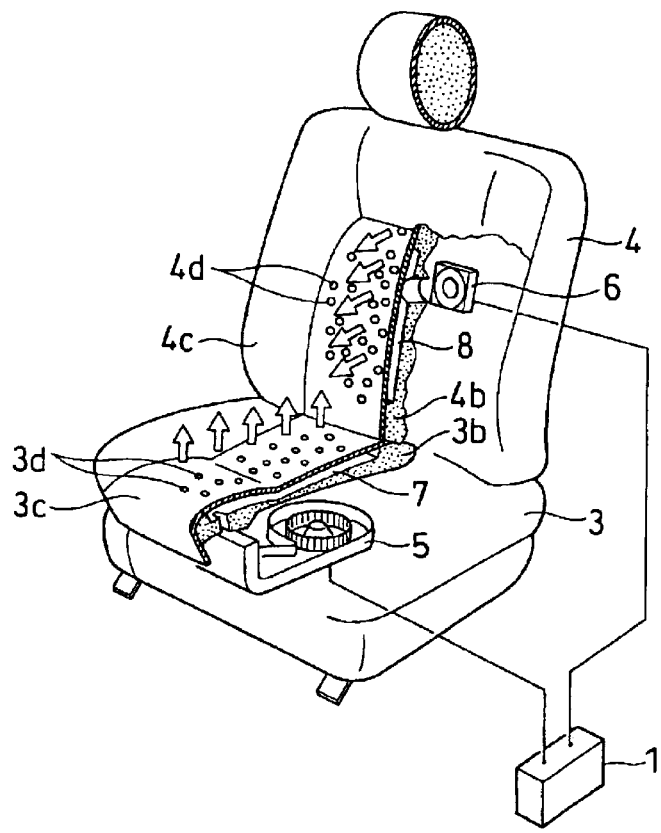
FIG. 2 is a partially sectional view showing a vehicle seat provided with a seat air conditioning unit according to the first embodiment.
Figure 3:
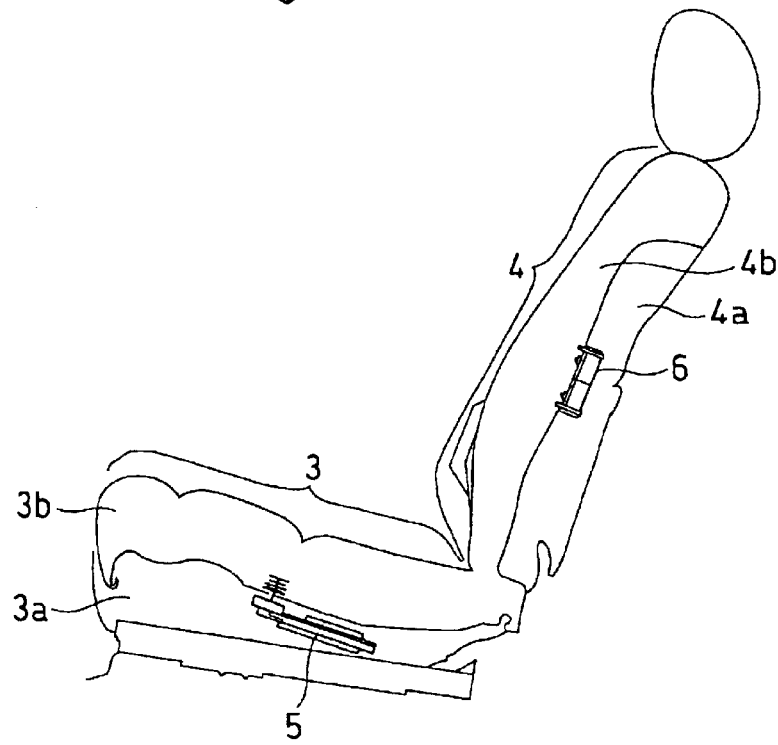
FIG. 3 is a schematic diagram showing blowers arranged in a seat cushion and a seat back of the vehicle seat, according to the first embodiment.

A first preferred embodiment of the present invention will be now described with reference to FIGS. 1–3. A vehicle air conditioner according to the first embodiment includes an interior air conditioning unit (front air conditioning unit) and a seat air conditioning unit. The interior air conditioning unit blows conditioned air from a front portion in a passenger compartment, so that air conditioning operation such as a cooling operation, a heating operation and a dehumidifying operation of the passenger compartment can be performed. The seat air conditioning unit is provided to blow conditioned air from a surface of a vehicle seat on which a passenger sits.

Figure 1:
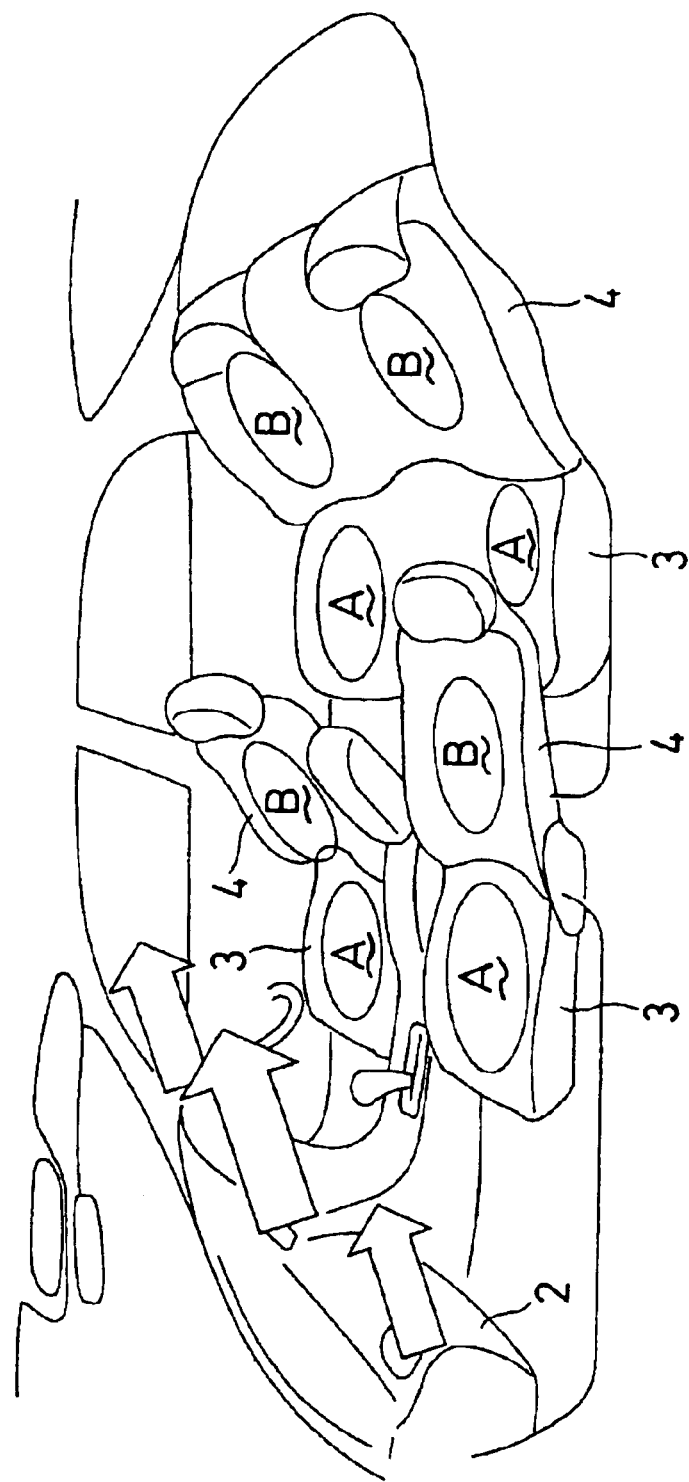
FIG. 1 is a schematic diagram showing a passenger compartment in a first embodiment of the present invention.

In FIG. 1, the interior air conditioning unit is an existent air conditioning unit disposed in a dashboard that is positioned at a front side in the passenger compartment. The interior air conditioning unit blows conditioned air (cool air, warm air, dehumidified air, etc.) from a face air outlet, a foot air outlet, a defroster air outlet and the like into the passenger compartment, in accordance with an operation state set by the passenger. In this way, the interior air conditioning unit performs the air conditioning operation such as the cooling operation, the heating operation and dehumidifying operation of the passenger compartment. As shown in FIG. 2, the seat air conditioning unit is controlled by an electronic control unit (ECU) 1. Because the interior air conditioning unit and the seat air conditioning unit are controlled by using the single ECU 1, both of the interior air conditioning unit and the seat air conditioning unit can be controlled to be operatively linked with each other.

The seat air conditioning unit is provided in a vehicle seat having a seat cushion 3 for receiving the hip portion and the thigh portion of a passenger sitting on the vehicle seat, and a seat back 4 for receiving the waist portion and the shoulder portion of the passenger sitting on the vehicle seat. Conditioned air can be blown from a surface of the seat cushion 3 through a cushion air passage in the seat cushion, and can be blown from a surface of the seat back 4 through a back air passage in the seat back 4. Specifically, in FIG. 1, conditioned air can be blown from an area A of each seat cushion 3, and can be blown from an area B of each seat back 4.

In the first embodiment, conditioned air blown from the seat cushion 3 and the seat back 4 is air in the passenger compartment. For example, when the passenger compartment is cooled by the interior air conditioning unit in a cooling operation, the conditioned air in the seat air conditioning unit is the cool air supplied into the passenger compartment from the interior air conditioning unit. On the contrary, when the passenger compartment is heated by the interior air conditioning unit in a heating operation, the conditioned air in the seat air conditioning unit is warm air supplied into the passenger compartment from the interior air conditioning unit.

Hereinafter, the first embodiment will be described in a condition where cool air is blown from the surface of the seat cushion 3 and the surface of the seat back 4 in the cooling operation. As shown in FIG. 2, a cushion fan 5 is provided as a blower used only for the seat cushion 3, and a back fan 6 is provided as a blower used only for the seat back 4. Air blowing amounts from these fans 5, 6 are independently controlled by the ECU 1. In this way, at least in the cooling operation, an air blowing amount from the surface of the seat back 4 is set smaller than that from the surface of the seat cushion 3 while a passenger sits on the vehicle seat that is constructed by the seat cushion 3 and the seat back 4. Thus, a cooling capacity of cool air blown from the surface of the seat back 4 can be set smaller than a cooling capacity of cool air blown from the surface of the seat cushion 3.

The seat cushion 3 includes a cushion urethane pad 3a, a cushion sponge layer 3b provided on the cushion urethane pad 3a and a cushion surface 3c covering a surface of the cushion sponge layer 3b. The cushion surface 3c is made of a material such as kip, synthetic kip and moquette. The cushion sponge layer 3b has a very high air permeability. A good seat feeling is given due to the cushion sponge layer 3b to the passenger on the seat cushion 3. When the cushion surface 3c is made of a material having a low air permeability such as kip and synthetic kip, the cushion surface 3c needs to have a large number of air outlets thereon. On the contrary, when the cushion surface 3c is made of a material having a high air permeability such as moquette, the cushion surface 3c is not required to have the plural air outlets thereon.

The cushion fan 5 constructed of a centrifugal fan is disposed inside the seat cushion 3 or at a bottom portion of the seat cushion 3. In the cooling operation, the cushion fan 5 sucks cool air in the passenger compartment, and blows the sucked cool air into a cushion distribution passage 7. The cushion distribution passage 7 is provided in the cushion sponge layer 3b to be distributed in a wider area of the cushion sponge layer 3b in a surface direction and to be opened to the upper surface of the cushion sponge layer 3b. The air introduced into the cushion distribution passage 7 is blown from the upper surface of the seat cushion 3. That is, in the cooling operation, cool air in the passenger compartment is sucked by the cushion fan 5, and the sucked air is blown by the cushion fan 5 to the hip portion and the thigh portion of the passenger from the cushion surface 3c.

The seat back 4 is constructed substantially in the same manner as the seat cushion 3. That is, the seat back 4 includes a back urethane pad 4a, a back sponge layer 4b provided on the back urethane pad 4a and a back surface 4c covering a surface of the back sponge layer 4b. The back surface 4c is made of a material such as kip, synthetic kip and moquette. The back sponge layer 3b has a very high air permeability. A good seat feeling can be given due to the back sponge layer 4b to the passenger on the seat back 4. When the back surface 4c is made of a material having a low air permeability such as kip and synthetic kip, the back surface 4c needs to have a large number of air outlets thereon. On the contrary, when the back surface 4c is made of a material having a high air permeability such as moquette, the back surface 4c is not required to have the air outlets thereon.

The back fan 6 constructed of a centrifugal fan is disposed inside the seat back 4 or at the back portion of the seat back 4. In the cooling operation, the back fan 6 sucks cool air in the passenger compartment, and blows the sucked cool air into a back distribution passage 8. The back distribution passage 8 is provided in the back sponge layer 4b to be distributed in a wider area of the back sponge layer 4b in a surface direction and to be opened to a front surface of the back sponge layer 4b. The air in the back distribution passage 8 is blown from the front surface of the seat back 4. That is, in the cooling operation, cool air in the passenger compartment is sucked by the back fan 6, and the sucked air is blown by the back fan 6 to the shoulder portion and the waist portion of the passenger from the back surface 4c.

When seat air conditioning operation is selected by the passenger in the cooling operation of the passenger compartment, the ECU 1 controls the cushion fan 5 and the back fan 6 so that the air blowing amount from the seat back 4 is set smaller than the air blowing amount from the cushion seat 3 while the passenger sits on the vehicle seat. That is, in this case, the cooling capacity of air from the surface of the seat back 4 is set smaller than the cooling capacity of air from the surface of the seat cushion 3. Therefore, even when the seat air conditioning unit operates for a long time in the cooling operation, the cooling capacity of cool air blown from the seat back 4 can be set smaller, thereby preventing the waist portion of the passenger from being excessively cooled. Further, because cool air is blown from the seat cushion 3 directly to the passenger on the vehicle seat, comfortable cooling feeling can be given to the passenger on the vehicle seat.

In the first embodiment and the following embodiments, the cooling capacity includes at least one of an air blowing temperature, an air blowing amount. That is, in a case where the cooling capacity is large, the air blowing temperature is low, or/and the air blowing amount is large. On the other hand, in a case where the cooling capacity is small, the air blowing temperature is high, or/and the air blowing amount is small, or an operation of the seat air conditioning unit is stopped.

(Second Embodiment)

The second embodiment of the present invention will be now described with reference to FIG. 4.

In the above-described first embodiment, when the seat air conditioning operation is selected by the passenger in the cooling operation of the passenger compartment, the air blowing amount from the seat back 4 is set smaller by the ECU 1, so that the cooling capacity of the seat back 4 is set smaller. However, in the second embodiment, when a predetermined time passes after the seat air conditioning operation is started in the cooling operation, the cooling capacity of cool air blown from the seat back 4 is set smaller.

Figure 4:
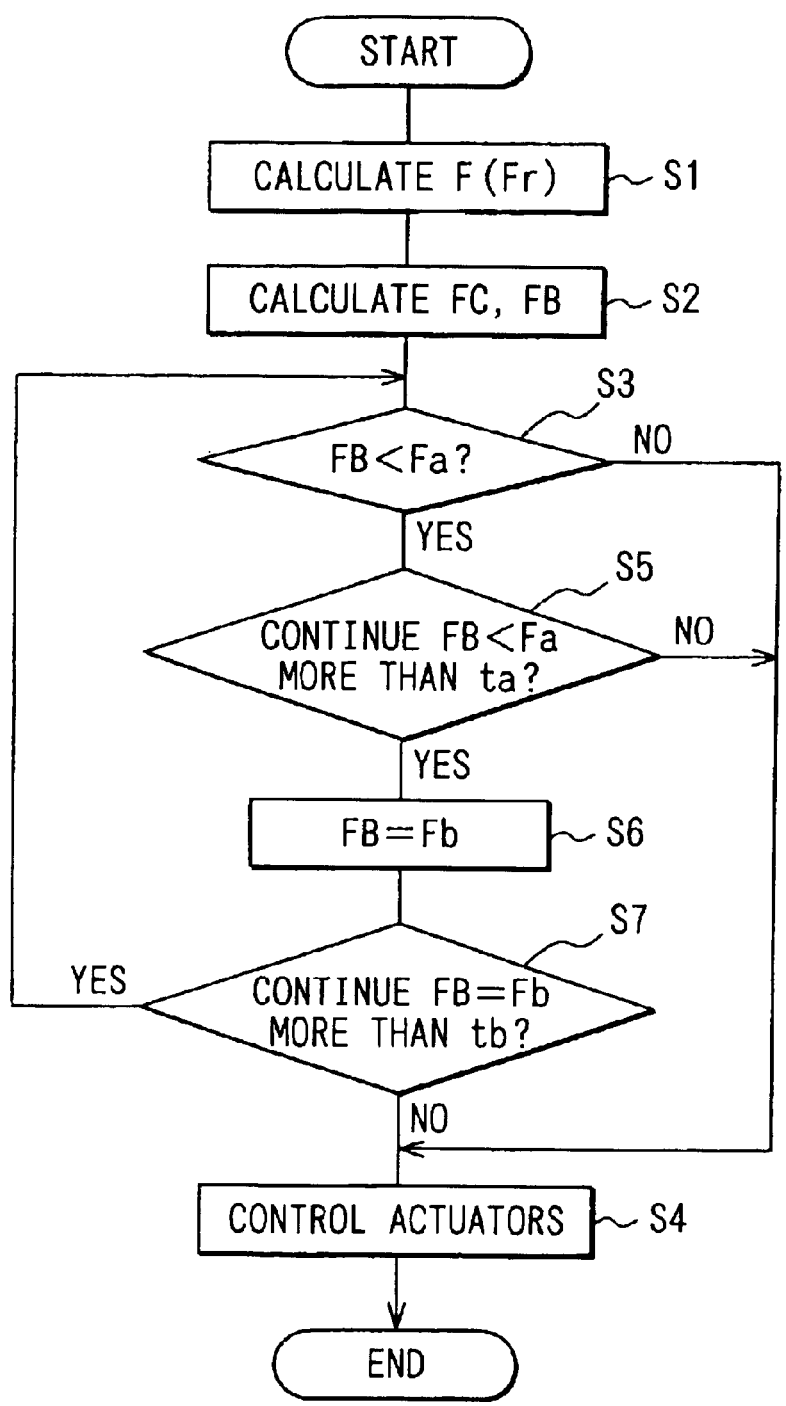
FIG. 4 is a flow diagram showing an example of a control process of a seat air conditioning unit according to a second embodiment of the present invention.

As shown in FIG. 4, at step S1, a control value F(Fr) of the interior air conditioning unit is calculated based on outputs of sensors such as a suction air temperature sensor and an inside air temperature sensor, a set air temperature set by the passenger and the like. At step S2, a control value FC of the seat cushion 3 and a control value FB of the seat back 4 are calculated. Specifically, the control values FC, FB are calculated by using the following formula (1) and the formula (2) based on the control value F(Fr) calculated at step S1, a set seat air blowing temperature ST set by the passenger and the like.

$$FC = F(Fr) - K \times ST \quad (1)$$

$$FB = F(Fr) - K' \times ST \quad (2)$$

wherein, K, K' is a constant. Further, as the control value F(Fr) reduces, the cooling capacity of the interior air conditioning unit is increased. As the control values FC (FB) reduces, the cooling capacity of the seat air conditioning unit is increased. The control values FC, FB calculated at step S2 are basically equal to each other. For example, the control value FC, FB is a control temperature of air in the seat air conditioning unit.

At step S3, it is determined whether or not the control value FB calculated at step S2 is smaller than a predetermined control value Fa. The control value Fa is for setting cooling capacity of the seat back 4 at a small capacity.

When the determination at step S3 is NO, that is, when it is determined at step S3 that the control value FB is not smaller than the predetermined control value Fa, it is determined that the cooling capacity of the seat back 4 is sufficiently small, and the cooling capacity thereof is not required to be reduced. Therefore, the control value FB calculated at step S2 is not changed, and the control program proceeds to step S4. At step S4, actuators in the interior air conditioning unit and the seat air conditioning unit are controlled so that the calculated control values F(Fr), FC and FB are obtained. Thereafter, the control program returns to step S1.

When the determination at step S3 is YES, that is, when it is determined at step S3 that the control value FB is smaller than the predetermined control value Fa, the control program proceeds to step S5. At step S5, it is determined whether or not the condition of FB<Fa is continued for a time period more than a predetermined time ta (minutes). When the determination at step S5 is NO, that is, when it is determined at step S5 that the condition of FB<Fa is not continued for the time period more than the predetermined time ta, it is determined that the predetermined time ta does not pass after the operation of the seat air conditioning unit is started, or after the passenger increases the cooling capacity of the seat air conditioning unit. Therefore, the control value FB calculated at step S2 is not changed, and the control program proceeds to step S4. At step S4, the cushion fan 5 and the back fan 6 are controlled so that the cooling capacity of the seat cushion 3 and the seat back 4 corresponding to the calculated control values FC, FB are obtained. In this case, the seat air conditioning operation is performed while the cooling capacity of cool air blown from the seat back 4 is not reduced.

On the other hand, when the determination at step S5 is YES, that is, when it is determined at step S5 that the condition of FB<Fa is continued for a time period more than the predetermined time ta, it is determined that the predetermined time ta passes after the operation of the seat air conditioning unit is started, or after the passenger increases the cooling capacity of the seat air conditioning unit. In this case, at step S6, the control value FB calculated at step S2 is changed to a predetermined control value Fb corresponding to a small cooling capacity of the seat back 4. Generally, the predetermined control value Fb is equal to or larger than the predetermined control value Fa.

At step S7, it is determined whether or not the condition of FB=Fa is continued for a time period equal to or more than a predetermined time tb (minutes). When the determination at step S7 is YES, that is, when it is determined at step S7 that the condition of FB=Fa is continued for a time period longer than the predetermined time tb, the control program returns to step S3. On the other hand, when the determination at step S7 is NO, that is, when it is determined at step S7 that the condition of FB=Fb is not continued longer than the predetermined time tb, the control program proceeds to step S4. At step S4, the back fan 6 is controlled so that the calculated control value FB is set at the predetermined control value Fb, so that the cooling capacity of cool air blown from the seat back 4 is set smaller.

In the second embodiment, the cooling capacity can be increased in both of the seat cushion 3 and the seat back 4. Therefore, when the passenger strongly desires cooling feeling by using the seat air conditioning operation, for example, directly after the seat air conditioning operation is started, or directly after the passenger increases the cooling capacity of the seat air conditioning, cooling feeling given to the passenger can be sufficiently improved. Then, when a predetermined time passes after the seat air conditioning operation is started or after the passenger increases the cooling capacity of the seat air conditioning unit, the cooling capacity of the seat back 4 is reduced, thereby preventing the waist portion of the passenger from being excessively cooled. In the second embodiment, the other parts are similar to those of the above-described first embodiment.

(Modifications of First and Second Embodiments)

In the seat air conditioning unit according to the above-described first and second embodiments, the inside air (cool air) of the passenger compartment, after being blown from the interior air conditioning unit into the passenger compartment, is drawn by the cushion fan 5 and the back fan 6, and is blown from the surfaces of the seat cushion 3 and the seat back 4. However, the existent interior air conditioning unit and the seat air conditioning unit can be connected to each other by using an air duct and the like. In this case, the conditioned air, temperature-controlled by the interior air conditioning unit, is directly drawn by the cushion fan 5 and the back fan 6, and is blown from the surfaces of the vehicle seat (both of the seat cushion 3 and the seat back 4) while the cooling capacity of cool air blown from the seat back 4 is reduced.

Further, in the seat air conditioning unit according to the above-described first and second embodiments, the cooling capacity of the seat back 4 is reduced only by controlling the air amount. However, the cooling capacity of the seat back 4 can be reduced by increasing an air temperature blown from the seat back 4. Alternatively, the cooling capacity of the seat back 4 can be reduced by reducing a cool air amount blown from the seat back 4 while increasing a cool air temperature blown from the seat back 4.

(Third Embodiment)

In the above-described first and second embodiments, when the seat air conditioning operation is selected in the cooling operation of the interior air conditioning unit, the cooling capacity of the seat back 4 is reduced, thereby preventing the waist portion of the passenger seated on the vehicle seat from being excessively cooled. However, in the third embodiment, when the seat air conditioning operation is selected in the cooling operation of the interior air conditioning unit, the cooling capacity of the cool air blown from the vehicle seat (both of the seat cushion 3 and the seat back 4) is reduced, thereby preventing the waist portion of the passenger from being excessively cooled.

Figure 5:
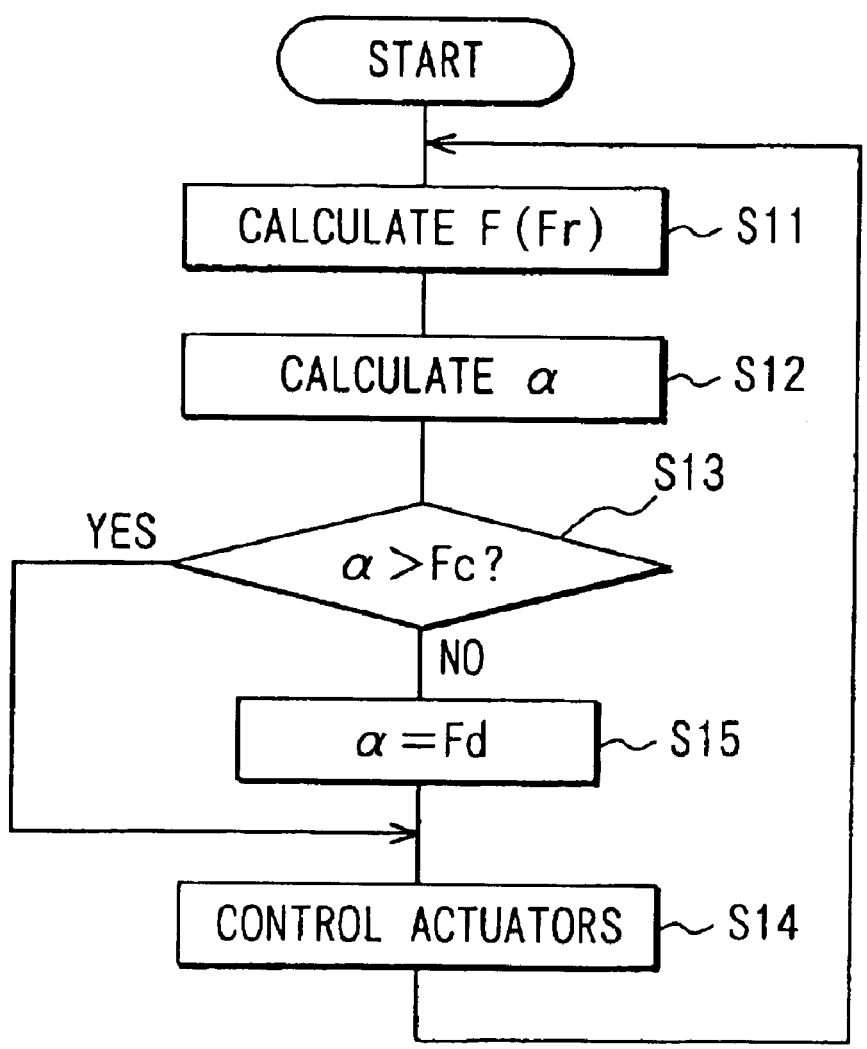
FIG. 5 is a flow diagram showing an example of a control process of a seat air conditioning unit according to a third embodiment of the present invention.

Specifically, the control operation in the third embodiment will be described with reference to FIG. 5. At step S11, the control value F(Fr) of the interior air conditioning unit is calculated based on sensor outputs of a suction air temperature and an inside air temperature, a set air temperature set by the passenger, and the like. At step S12, a control value α of the seat air conditioning unit is calculated by the following formula (3) based on the control value F(Fr) calculated at step S11, a set seat air blowing temperature ST set by the passenger, and the like.

$$\alpha = F(Fr) - K \times ST \quad (2)$$

wherein, K is a constant.

At step S13, it is determined whether or not the control value α of the seat air conditioning unit calculated at step S12 is larger than a predetermined value Fc. The control value Fc is for setting the cooling capacity of the seat air conditioning unit at a small value. When the determination at step S13 is YES, that is, when it is determined at step S13 that the control value α of the seat air conditioning unit is larger than the predetermined control value Fc, it is determined that the cooling capacity of the seat air conditioning unit is sufficiently small, and the cooling capacity of the seat air conditioning unit is not required to be further reduced. Therefore, the control value α calculated at step S12 is not changed, and the control program proceeds to step S14. At step S14, actuators in the interior air conditioning unit and the seat air conditioning unit are controlled so that the calculated control values F(Fr), α are obtained. Thereafter, the control program returns to step S11.

When the determination at step S13 is NO, and when this condition is continued for a long time, it is determined that the passenger may have lumbago, and the control program proceeds to step S15. At step S15, the control value α calculated at step S12 is changed to a predetermined control value Fd corresponding to a small cooling capacity of the seat air conditioning unit. Generally, the control value Fd is equal to or larger than the control value Fc. Thereafter, the control program proceeds to step S14, and the actuators are controlled so that the cooling capacity of the seat air conditioning unit is reduced.

In the third embodiment, as described above, the cooling capacity of the seat air conditioning unit is reduced in the cooling operation of the interior air conditioning unit. Therefore, even when the cooling operation of the seat air conditioning unit is continued for a long time while the cooling operation of the interior air conditioning unit is performed, the cooling capacity of cool air blown from the seat air conditioning unit can be made smaller, thereby preventing the waist portion of the passenger from being excessively cooled.

(Fourth Embodiment)

Figure 6:
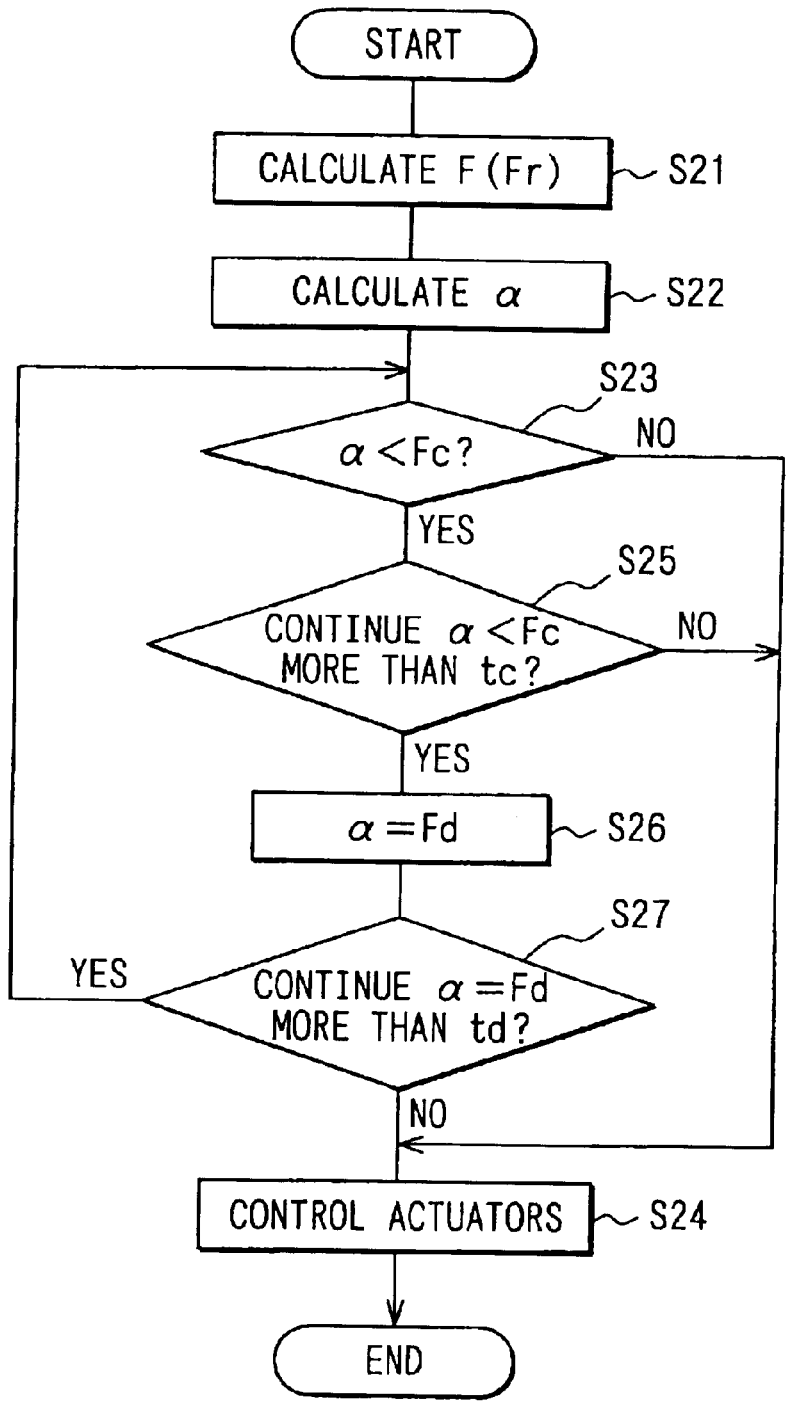
FIG. 6 is a flow diagram showing an example of a control process of a seat air conditioning unit according to a fourth embodiment of the present invention.

The fourth embodiment of the present invention will be now described with reference to FIG. 6.

In the above-described third embodiment of the present invention, when the seat air conditioning operation is selected by the passenger in the cooling operation of the interior air conditioning unit, the cooling capacity of the seat air conditioning unit is reduced. However, in the fourth embodiment, when a predetermined time passes after the cooling operation of the seat air conditioning unit is started, the cooling capacity of the seat air conditioning unit is reduced.

Next, the control operation in the fourth embodiment will be described with reference to FIG. 6. At step S21, the control value F(Fr) of the interior air conditioning unit is calculated based on sensor outputs of a suction air temperature and an inside air temperature, a set air temperature set by the passenger, and the like. At step S22, the control value α of the seat air conditioning unit is calculated by the formula (3) based on the control value F(Fr) calculated at step S21 the set seat air blowing temperature ST set by the passenger, and the like.

At step S23, it is determined whether or not the control value α of the seat air conditioning unit calculated at step S22 is smaller than the predetermined value Fc. The control value Fc is for setting the cooling capacity of the seat air conditioning unit at a small value. When the determination at step S23 is NO, that is, when it is determined at step S23 that the control value α is not smaller than the predetermined control value Fc, it is determined that the cooling capacity of the seat air conditioning unit is sufficiently small, and the cooling capacity of the seat air conditioning unit is not required to be reduced. Therefore, the control value α calculated at step S22 is not changed, and the control program proceeds to step S24. At step S24, actuators in the interior air conditioning unit and the seat air conditioning unit are controlled so that the calculated control values F(Fr), α are obtained. Thereafter, the control program returns to step S21.

When the determination at step S23 is YES, it is determined at step S25 whether or not the condition of α<Fc is continued more than a predetermined time tc (minutes). When the determination at step S25 is NO, that is, when it is determined at step S25 that the condition of α<Fc is not continued more than the predetermined time tc, it is determined that the predetermined time tc does not pass after the operation of the seat air conditioning unit is started, or after the passenger increases the cooling capacity of the seat air conditioning unit. Therefore, the seat air conditioning operation is controlled while the control value α of the seat air conditioning unit calculated at step S22 is not changed, and the control program proceeds to step S24. At step S24, the seat air conditioning operation is controlled so that the seat air conditioning performance corresponding to the control value α can be obtained. As a result, the cooling operation of the seat air conditioning unit can be performed while the cooling capacity of the seat air conditioning unit is not reduced.

On the other hand, when the determination at step S25 is YES, that is, when it is determined at step S25 that the condition of α<Fc is continued more the predetermined time tc, it is determined that the predetermined time tc passes after the operation of the seat air conditioning unit is started, or after the passenger increases the cooling capacity of the seat air conditioning unit. Then, at step S26, the control value α of the seat air conditioning unit calculated at step S22 is changed to a predetermined control value Fd corresponding to a small cooling capacity of the seat air conditioning unit. Generally, the predetermined control value Fd is equal to or larger than the predetermined control value Fc.

At step S27, it is determined whether or not the condition of α=Fd is continued for a time period more than a predetermined time td (minutes). When the determination at step S27 is YES, that is, when it is determined at step S27 that the condition of α=Fd is continued more than the predetermined time td, the control program returns to step S23. On the other hand, when the determination at step S27 is NO, the control program returns to step S24. At step S24, the seat air conditioning operation is controlled so that the control value α of the seat air conditioning unit is set at the predetermined control value Fd corresponding to the small cooling capacity of the seat air conditioning unit, so that the cooling capacity of cool air blown from the seat air conditioning unit is set smaller.

In the fourth embodiment, the cooling capacity of the seat air conditioning unit can be increased. Therefore, when the passenger strongly desires cooling feeling by the seat air conditioning unit, for example, in a case directly after the seat air conditioning operation is started or directly after the passenger increases the cooling capacity of the seat air conditioning unit, cooling feeling can be sufficiently given to the passenger by the seat air conditioning unit. Then, when the predetermined time passes after the seat air conditioning operation is started or after the passenger increases the cooling capacity of the seat air conditioning unit, the cooling capacity of the seat air conditioning unit is reduced, thereby preventing the waist portion of the passenger from being excessively cooled.

(Modifications of Third and Fourth Embodiments)

In the seat air conditioning unit according to the third and fourth embodiments, the cooling capacity of the seat air conditioning unit (both of the seat cushion 3 and the seat back 4) is reduced in the cooling operation of the interior air conditioning unit, thereby preventing the waist portion of the passenger from being excessively cooled. However, the first and second embodiments and the third and fourth embodiments can be combined together. That is, in the third and fourth embodiments, the cooling capacity of the seat back 4 can be further reduced in the cooling operation of the interior air conditioning unit, thereby further preventing the waist portion of the passenger from being excessively cooled.

In the seat air conditioning unit according to the third and fourth embodiments, the inside air (cool air) of the passenger compartment, after being blown from the interior air conditioning unit into the passenger compartment, is drawn into and is blown from the seat air conditioning unit. However, the existent interior air conditioning unit and the seat air conditioning unit can be connected together by an air duct and the like. In this case, the conditioned air, temperature-controlled by the interior air conditioning unit, can be directly blown from the vehicle seat (both of the seat cushion 3 and the seat back 4) while the cooling capacity of the seat air conditioning unit is reduced in the cooling operation of the interior air conditioning unit. Further, in the seat air conditioning unit according to the third and fourth embodiments, the cooling capacity of the seat air conditioning unit is reduced only by air amount control. However, the cooling capacity of the seat air conditioning unit can be reduced by increasing an air temperature blown from the seat air conditioning unit. Alternatively, the cooling capacity of the seat air conditioning unit can be reduced by reducing a cool air amount blown from the seat air conditioning unit while increasing the air temperature blown from the seat air conditioning unit.

(Fifth Embodiment)

The fifth embodiment of the present invention will be now described with reference to FIGS. 7 and 8.

Figure 7:
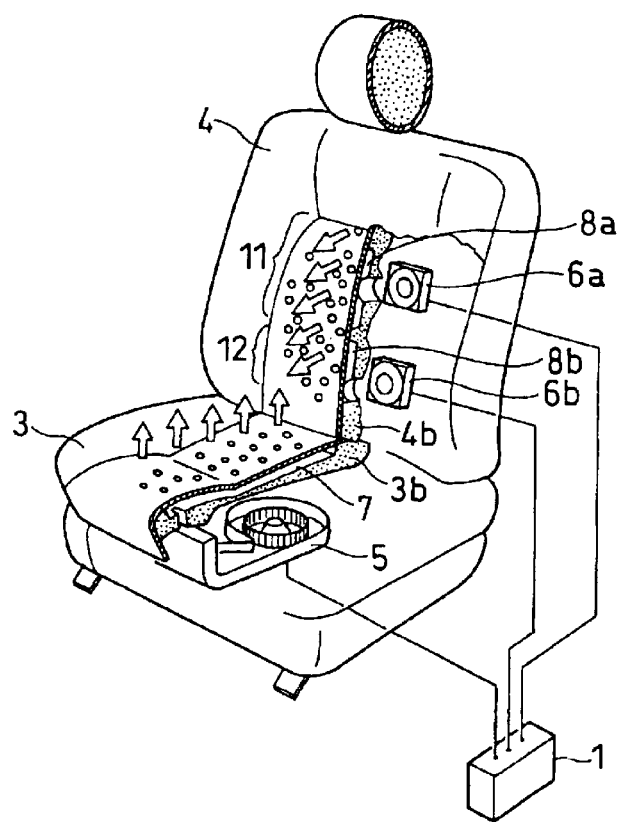
FIG. 7 is a partial sectional view showing a vehicle seat provided with a seat air conditioning unit according to a fifth embodiment of the present invention.
Figure 8:
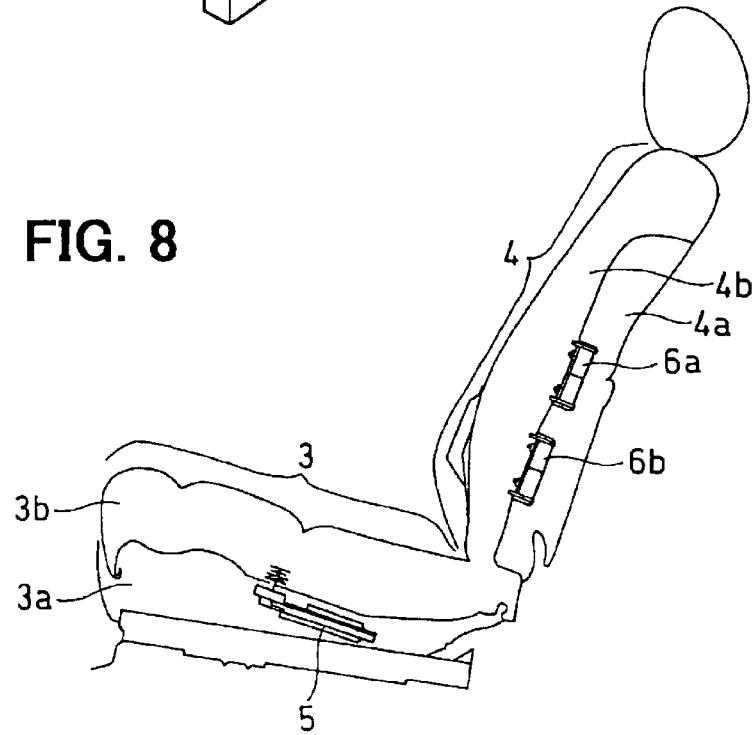
FIG. 8 is a schematic diagram showing blowers arranged in a seat cushion and a seat back of the vehicle seat according to the fifth embodiment.

In the fifth embodiment, as shown in FIG. 7, the seat back 4 includes a high-back blowing portion 11 (high-back blowing means) and a low-back blowing portion 12 (low-back blowing means). The high-back blowing portion 11 is provided to blow cool air only from a surface of the seat back 4 for receiving the shoulder portion of the passenger, that is, from an upper side surface of the seat back 4 to the shoulder portion of the passenger. The low-back blowing portion 12 is provided to blow cool air only from a surface of the seat back 4 for receiving the waist portion of the passenger, that is, from a lower side surface of the seat back 4 to the waist portion of the passenger. At least in the cooling operation of the interior air conditioning unit, the cooling capacity of cool air blown from the low-back blowing portion 12 is set smaller than the cooling capacity of cool air blown from the seat cushion 3 and than the cooling capacity of the high-back blowing portion 11 while the passenger sits on the vehicle seat. In the fifth embodiment, an air amount blown from the low-back blowing portion 12 is set smaller than an air amount blown from the high-back blowing portion 11, thereby reducing the cooling capacity of air from the low-back blowing portion 12 than that of air from the high-back blowing portion 11.

A high-back fan 6a is provided as a blower used only for the high-back blowing portion 11, and a low-back fan 6b is provided as a blower used only for the low-back blowing portion 12. An air blowing amount of the high-back fan 6a, an air blowing amount of the low-back fan 6b and an air blowing amount of the cushion fan 5 are controlled by the ECU 1 independently from each other. As shown in FIG. 8, the high-back fan 6a and the low-back fan 6b are disposed inside or at the backside of the seat back 4. The high-back fan 6a sucks air in the passenger compartment, and blows the sucked air into a high-back distribution passage 8a provided in an upper portion in the back sponge layer 4b. The high-back distribution passage 8a has plural openings arranged in a wide area of the upper front surface of the seat back 4 receiving the shoulder portion of the passenger. Therefore, the air blown by the high-back fan 6a is introduced into the high-back distribution passage 8a and is blown to the shoulder portion of the passenger.

On the other hand, the low-back fan 6b sucks air in the passenger compartment, and blows the sucked air into a low-back distribution passage 8b. The low-back distribution passage 8b has plural openings arranged in a wide area of the lower front surface of the seat back 4 receiving the waist portion of the passenger. Therefore, air is blown by the low-back fan 6b is introduced into the low-back distribution passage 8b and is blown to the waist portion of the passenger. When the seat air conditioning operation is selected by the passenger in the cooling operation of the interior air conditioning unit while the passenger sits on the vehicle seat, the ECU 1 controls the high-back fan 6a and the low-back fan 6b, so that an air blowing amount of the high-back fan 6a and an air blowing amount of the cushion fan 5 are larger than an air blowing amount of the low-back fan 6b. Thus, an air blowing amount from the low-back blowing portion 12 is set smaller than an air blowing amount from the high-back blowing portion 11 and an air blowing amount from the seat cushion 3.

In the fifth embodiment, as described above, the cooling capacity of cool air blown from the low-back blowing portion 12 of the seat back 4 can be set smaller. Therefore, even when the cooling operation of the interior air conditioning unit is continued for a long time while the seat air conditioning operation is selected, the waist portion of the passenger can be prevented from being excessively cooled. Further, cooling feeling can be effectively given to the passenger by using cool air blown from the high-back blowing portion 11 and cool air blown from the seat cushion 3. Thus, comfortable cooling feeling can be given to the passenger by using the seat air conditioning operation.

(Sixth Embodiment)

The sixth embodiment is a modification of the above-described fifth embodiment.

In the above-described fifth embodiment, when the seat air conditioning operation is selected by the passenger in the cooling operation of the interior air conditioning unit, the air blowing amount from the low-back blowing portion 12 is set smaller than that from the high-back blowing portion 11. However, in the sixth embodiment, when a predetermined time passes after the seat air conditioning operation is started, the air blowing amount from the low-back blowing portion 12 is set smaller. In the sixth embodiment, when the passenger strongly desires the cooling feeling by using the seat air conditioning operation, for example, directly after the seat air conditioning operation is started, the cooling capacity (e.g., air blowing amount in the sixth embodiment) can be set larger in all of the seat cushion 3, the high-back blowing portion 11 and the low-back blowing portion 12, so that cooling feeling given to the passenger can be sufficiently improved. Then, when the predetermined time passes, the cooling capacity of the low-back blowing portion 12 is set smaller, thereby preventing the waist portion of the passenger from being excessively cooled. In the sixth embodiment, the other parts are similar to those of the above-described fifth embodiment.

(Seventh Embodiment)

The seventh embodiment of the present invention will be now described with reference to FIGS. 9A and 9B.

In the above-described fifth and sixth embodiments, the air blowing amount from the high-back blowing portion 11 and the air blowing amount from the low-back blowing portion 12 are changed by changing an air blowing amount of the high-back fan 6a and an air blowing amount of the low-back fan 6a, respectively. However, in the seventh embodiment, the air blowing amount from the low-back blowing portion 12 of the seat back 14 is set smaller than that from the high-back blowing portion 11 of the seat back 14 by using a single back fan 6.

Figure 9A:
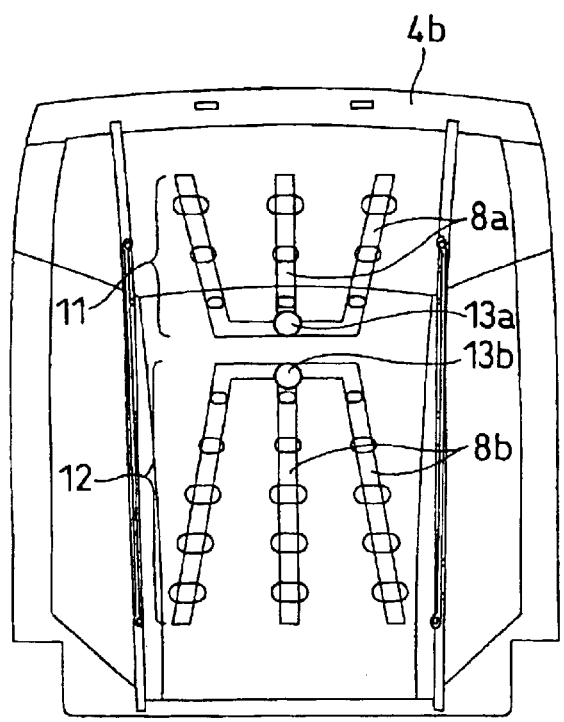
FIG. 9A is a plan view showing an air passage structure of a seat back according to a seventh embodiment of the present invention.
Figure 9B:
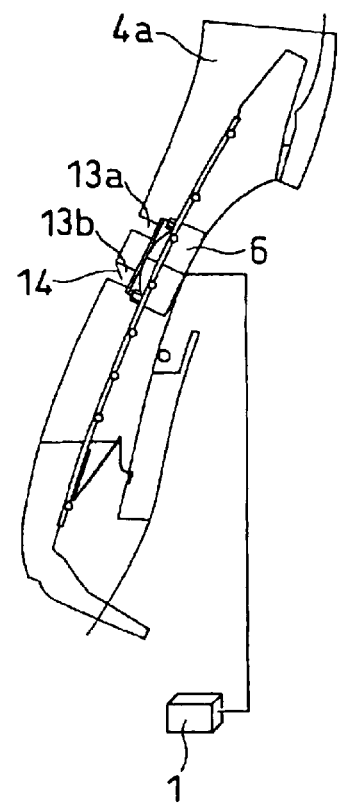
FIG. 9B is a schematic sectional view showing the air passage structure in a urethane pad of the seat back in FIG. 9A.

As shown in FIGS. 9A, 9B, the back fan 6 is attached to the back urethane pad 4a, and a high-back communication passage 13a and a low-back communication passage 13b are provided in the seat back 4 to communicate with a discharge port of the back fan 6. Air is blown by the back fan 6 into a high-back distribution passage 8a through the high-back communication passage 13a, and into a low-back distribution passage 8b through a low-back communication passage 13b. A damper 14, for continuously or stepwise changing an open area of the low-back communication passage 13b, is disposed in the seat back 4, and is controlled by an actuator (not shown) to be opened and closed. This actuator is controlled by the ECU 1, so that the open area of the low-back communication passage 13b can be reduced by the damper 14. In this case, the air blowing amount from the low-back blowing portion 12 is reduced.

When the seat air conditioning operation is selected by the passenger in the cooling operation of the interior air conditioning unit, the damper 14 is controlled by the ECU 1, thereby reducing the open area of the low-back communication passage 13b, and reducing the cooling capacity of cool air blown from the low-back blowing portion 12. Accordingly, even when the cooling operation of the interior air conditioning unit is continued for a long time while the seat air conditioning operation selected, the waist portion of the passenger can be prevented from being excessively cooled. When the predetermined time passes after the seat air conditioning operation is selected in the cooling operation of the interior air conditioning unit, the ECU 1 controls the damper 14, so that the open area of the low-back communication passage 13b is reduced. In this way, when the passenger strongly desires cooling feeling by using the seat air conditioning operation, for example, in a case directly after the seat air conditioning operation is started, the cooling capacity (e.g., air blowing amount in the seventh embodiment) can be set larger in all of the seat cushion 3, the high-back blowing portion 11 and the low-back blowing portion 12 of the seat back 4, so that cooling feeling given to the passenger can be sufficiently improved. Then, when the predetermined time passes, the cooling capacity of the low-back blowing portion 12 of the seat back 4 is set smaller, thereby preventing the waist portion of the passenger from being excessively cooled.

(Eighth Embodiment)

Figure 10:
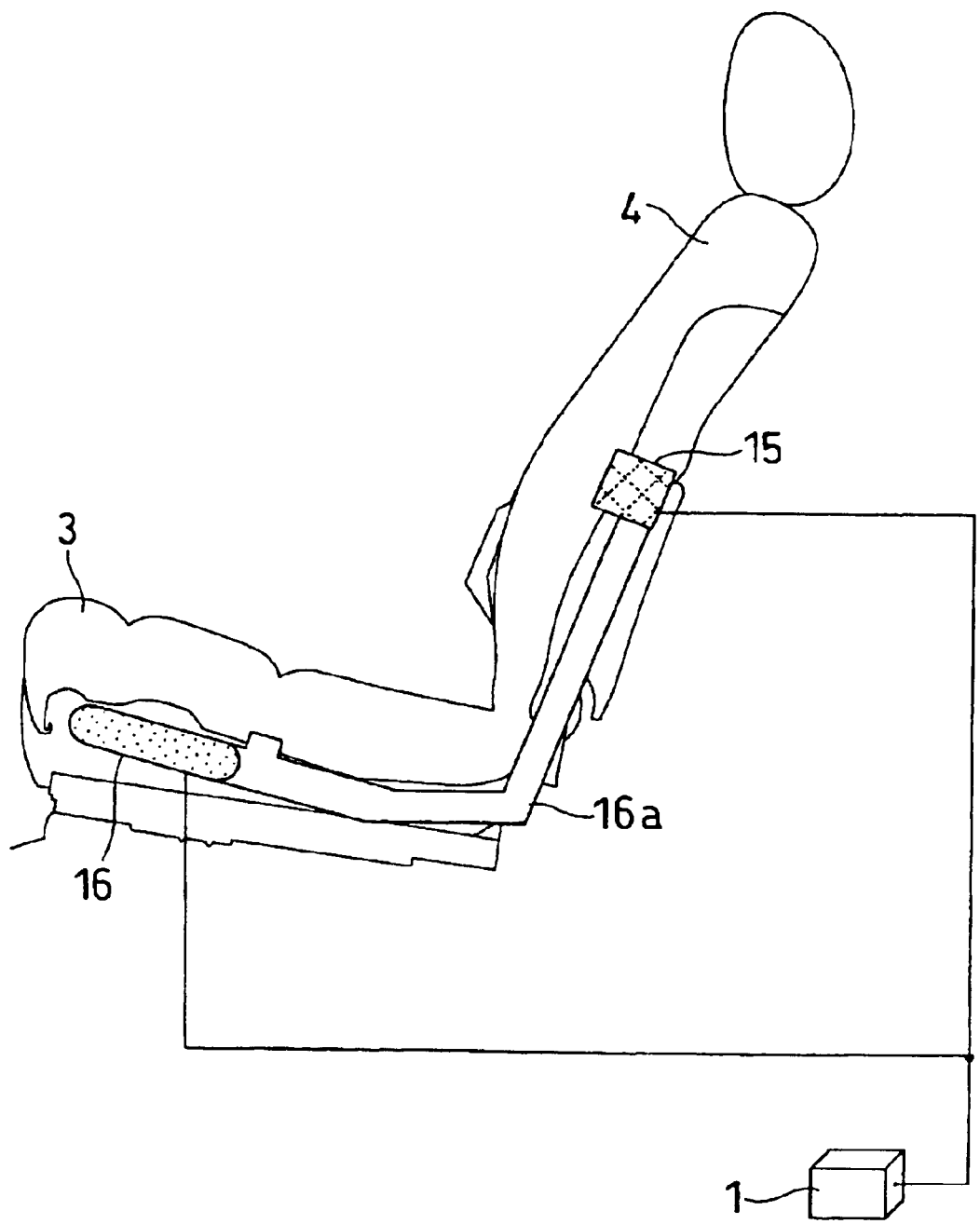
FIG. 10 is a schematic sectional view showing a vehicle seat provided with a seat air conditioning unit according to an eighth embodiment of the present invention.
Figure 11A:
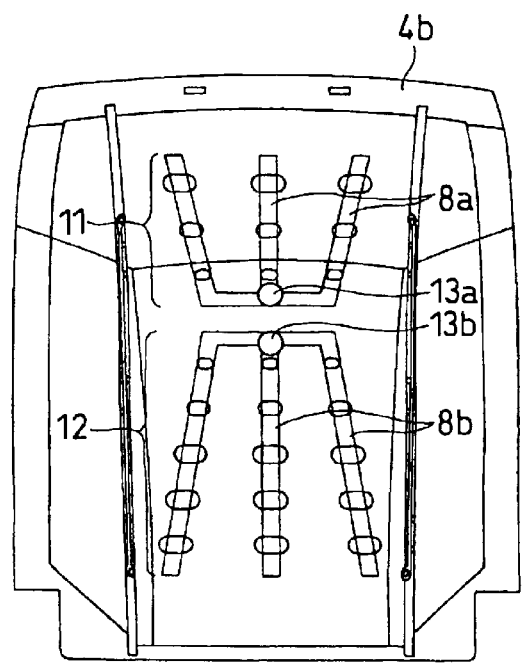
FIG. 11A is a plan view showing an air passage structure of a seat back according to the eighth embodiment of the present invention.
Figure 11B:
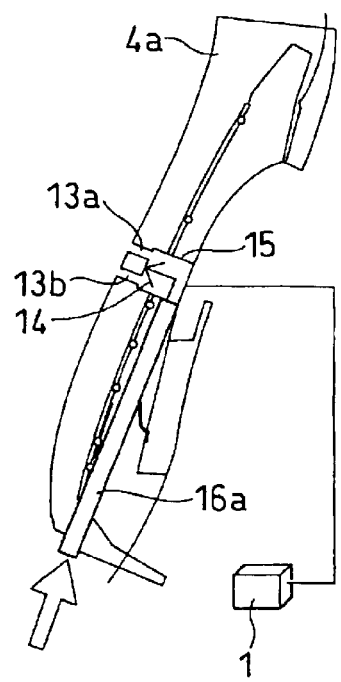
FIG. 11B is a schematic sectional view showing the air passage structure in a urethane pad of the seat back in FIG. 11A.
Figure 12:
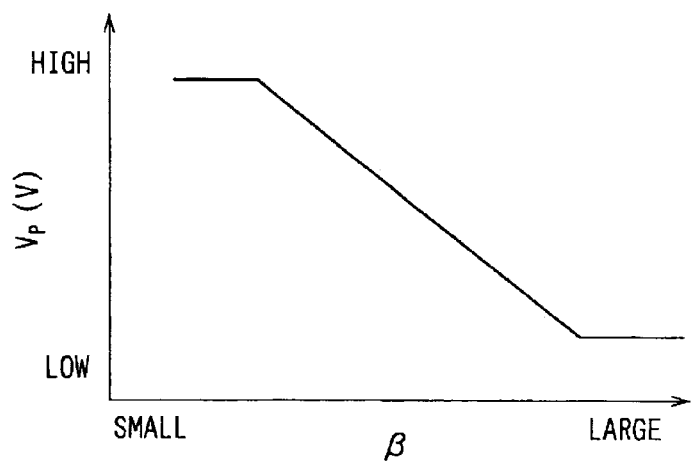
FIG. 12 is a graph showing a relationship between a control value B of a seat air conditioning unit and a voltage Vp applied to a peltier element, according to the eighth embodiment.

The eighth embodiment of the present invention will be now described with reference to FIGS. 10–12.

In the eighth embodiment, a single blower 16 is provided in a vehicle seat so that air is blown by the single blower 16 to the cushion distribution passage 7 (shown in FIG. 2) and to a branch/peltier unit 15, through an air duct 16a. The branch/peltier unit 15 includes a peltier element therein, and air supplied therein is distributed into the high-back communication passage 13a and the low-back communication passage 13b. Thus, the air can be blown from the surfaces of the seat cushion 3, the high-back blowing portion 11 and the low-back blowing portion 12, by using the single blower 16. As shown in FIGS. 11A, 11B, the branch/peltier unit 15 is disposed at a branch portion between the high-back communication passage 13a and the low-back communication passage 13b. The peltier element disposed in the branch/peltier unit 15 cools air to be introduced into the high-back communication passage 13a, and heats air to be introduced into the low-back communication passage 13b. In this way, the peltier element increases the cooling capacity of the high-back blowing portion 11, and reduces the cooling capacity of the low-back blowing portion 12. As shown in FIG. 11B, the damper 14 is disposed in the branch/peltier unit 15, and continuously or stepwise changes the open area of the low-back communication passage 13b to reduce the air blowing amount blown from the low-back blowing portion 12 of the seat back 4.

Also in the eighth embodiment, the damper 14 is controlled by the ECU 1 as in the seventh embodiment. That is, when the seat air conditioning operation is selected by the passenger in the cooling operation of the interior air conditioning unit, the damper 14 is controlled so that the open area of the low-back communication passage 13b is reduced. Thus, even when the cooling operation of the interior air conditioning unit is continued for a long time while the seat air conditioning operation selected, the waist portion of the passenger can be prevented from being excessively cooled.

Alternatively, when the predetermined time passes after the seat air conditioning operation is started in the cooling operation of the interior air conditioning unit, the damper 14 is controlled so that the open area of the low-back communication passage 13b is reduced. In this way, when the passenger strongly desires cooling feeling by using the seat air conditioning operation, for example, in a case directly after the seat air conditioning operation is started, the cooling capacity can be set larger in all of the seat cushion 3, the high-back blowing portion 11 and the low-back blowing portion 12, so that cooling feeling given to the passenger can be sufficiently improved. Then, when the predetermined time passes, the cooling capacity of the low-back blowing portion 12 is set smaller, thereby preventing the waist portion of the passenger from being excessively cooled.

When a voltage is applied to the peltier element disposed in the branch/peltier unit 15, the peltier element absorbs heat in one surface thereof, so that the one surface of the peltier element cools air. At this time, the peltier element radiates heat from the other surface thereof, so that the other surface of the peltier element heats air. The peltier element is disposed at the branch portion between the high-back communication passage 13a and the low-back communication passage 13b, and a voltage is applied to the peltier element, so that the peltier element cools air to be introduced into the high-back communication passage 13a and heats air to be introduced into the low-back communication passage 13b. The voltage to be applied to the peltier element is controlled by the ECU 1. For example, as shown in FIG. 12, as the control value β of the seat air conditioning operation reduces, a voltage Vp applied to the peltier element is controlled to be increased.

Thus, when high cooling capacity is required in the seat air conditioning operation, air to be introduced into the low-back communication passage 13b is effectively heated by the peltier element. That is, when the cooling capacity of the seat air conditioning unit is high, the cooling capacity of air to be blown to the waist portion of the passenger is reduced. As a result, even when the seat air conditioning operation is continued for a long time in the cooling operation of the interior air conditioning unit, the waist portion of the passenger can be prevented from being excessively cooled.

(Ninth Embodiment)

Figure 13A:
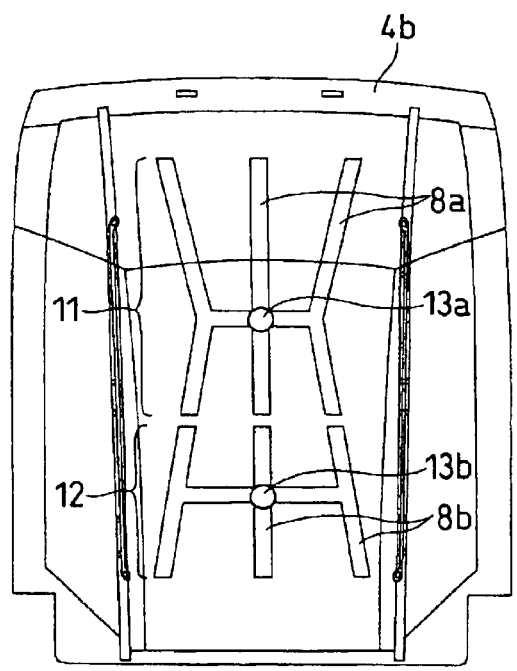
FIG. 13A is a plan view showing an air passage structure of a seat back according to a ninth embodiment of the present invention.
Figure 13B:
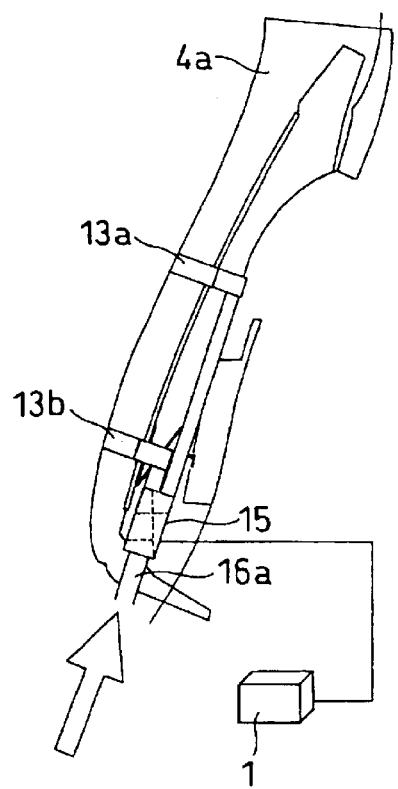
FIG. 13B is a schematic sectional view showing the air passage structure in a urethane pad of the seat back in FIG. 13A.
Figure 14:
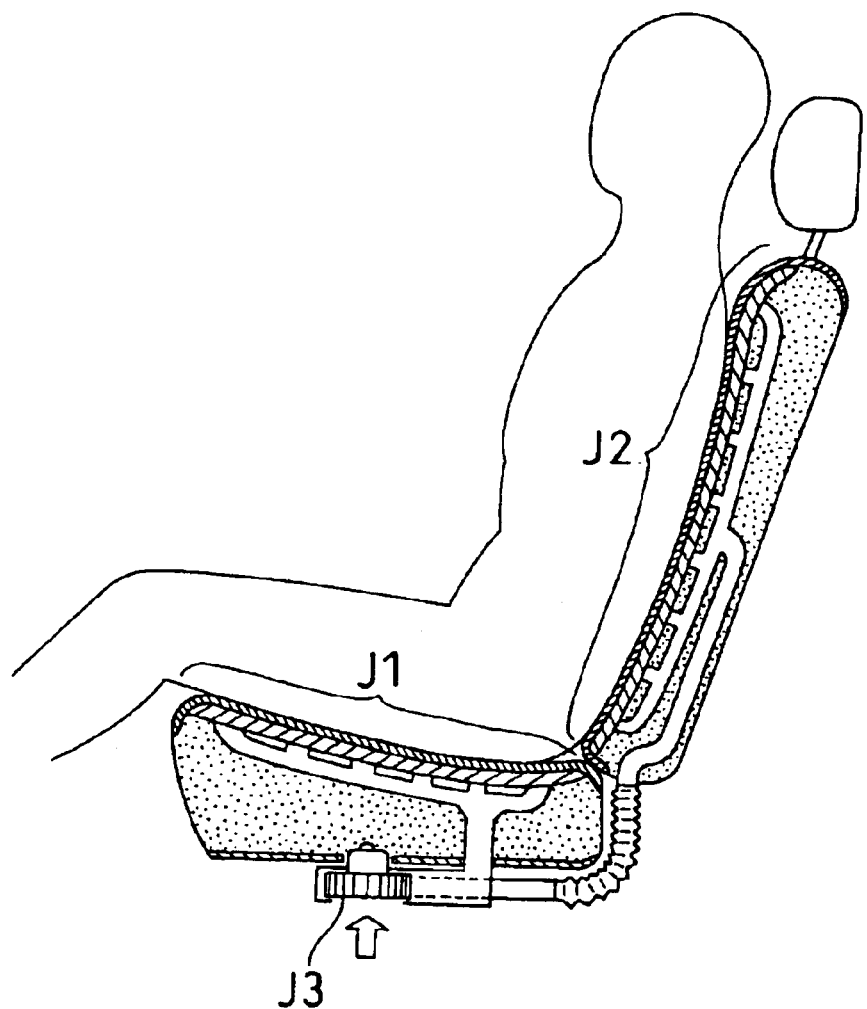
FIG. 14 is a schematic sectional view showing a vehicle seat provided with a seat air conditioning unit in a prior art.

The ninth embodiment of the present invention will be now described with reference to FIGS. 13A and 13B.

In the above-described eighth embodiment, the branch/peltier unit 15 is provided directly at an upstream air side of the high-back communication passage 13a and the low-back communication passage 13b. However, in the ninth embodiment, the branch/peltier unit 15 is provided in the air duct 16a. In the ninth embodiment, the other parts are similar to those of the above-described eighth embodiment. Therefore, the same operational effects as in the eighth embodiment can be obtained.

(Modification of the Fifth to Ninth Embodiments)

In the above-described fifth to ninth embodiments, air (cool air) is blown from the interior air conditioning unit into the passenger compartment, and the inside air of the passenger compartment is introduced into and is blown from the vehicle seat (both of the seat cushion 3 and the seat back 4). However, the seat air conditioning unit can be connected to the existent interior air conditioning unit by an air duct and the like. In this case, the conditioned air, temperature-controlled by the interior air conditioning unit, is directly introduced into and is blown from the vehicle seat while the cooling capacity of the low-back blowing portion 12 is reduced in the cooling operation of the interior air conditioning unit.

While the present invention has been shown and described with reference to the foregoing preferred embodiments, it will be apparent to those skilled in the art that changes in form and detail may be made there in without departing from the scope of the invention as defined in the appended claims.

What is claimed is:

1. An air conditioner for a vehicle, comprising:
a seat air conditioning unit for a vehicle seat that includes a seat cushion for receiving the hip portion of a passenger sitting on the vehicle seat, and a seat back for receiving the waist portion and the shoulder portion of the passenger; and
an electronic control unit for controlling the seat air conditioning unit, the seat air conditioning unit includes:
  a cushion blowing means provided in the seat cushion, for blowing air from a surface of the seat cushion to the hip portion of the passenger, the cushion blowing means being controlled by the electronic control unit; and
  a back blowing means provided in the seat back independently from the cushion blowing means, for blowing air from a surface of the seat back to the waist portion and the shoulder portion of the passenger, the back blowing means being controlled by the electronic control unit, wherein:
the electronic control unit controls the cushion blowing means and the back blowing means in such a manner that a cooling capacity of air blown from the seat back is smaller than a cooling capacity of air blown from the seat cushion while the passenger sits on the vehicle seat, after a seat cooling operation for blowing cool air from the vehicle seat is selected by the passenger.

2. The air conditioner according to claim 1, wherein:
the electronic control unit has a passing-time determination means for determining whether a predetermined time passes after the seat cooling operation is started; and
the electronic control unit controls the cushion blowing means and the back blowing means in such a manner that the cooling capacity of air blown from the seat back is smaller than the cooling capacity of air blown from the seat cushion while the passenger sits on the vehicle seat, when the passing-time determination means determines that the predetermined time passes after the seat cooling operation is started.

3. An air conditioner for a vehicle, comprising:
a seat air conditioning unit for a vehicle seat that includes a seat cushion for receiving the hip portion of a passenger sitting on the vehicle seat, and a seat back for receiving the waist portion and the shoulder portion of the passenger; and
an electronic control unit for controlling the seat air conditioning unit, the seat air conditioning unit includes:
  a cushion air passage provided in the seat cushion, through which air is blown from a surface of the seat cushion toward the hip portion of the passenger on the vehicle seat;
  a back air passage provided in the seat back, through which air is blown from a surface of the seat back toward the shoulder portion and the waist portion of the passenger sitting on the vehicle seat;
  a cushion fan provided in the seat cushion, for blowing air in the cushion air passage to the surface of the seat cushion, the cushion fan being controlled by the electronic control unit; and a back fan provided in the seat back independently from the cushion fan, for blowing air in the back air passage to the surface of the seat back, the back fan being controlled by the electronic control unit, wherein:

the electronic control unit controls an amount of air blown from the seat back to be smaller than an amount of air blown from the seat cushion while the passenger sits on the vehicle seat, after a seat cooling operation for blowing cool air from the vehicle seat is selected by the passenger.

4. The air conditioner according to claim 3, wherein:

the electronic control unit has a passing-time determination means for determining whether a predetermined time passes after the seat cooling operation is started; and the electronic control unit controls the amount of air blown from the seat back to be smaller than the amount of air blown from the seat cushion while the passenger sits on the vehicle seat, when the passing-time determination means determines that the predetermined time passes after the seat cooling operation is started.

5. The air conditioner according to claim 3, wherein:

the back air passage includes an upper passage portion through which air is blown by the back fan from a first surface portion of the seat back for receiving shoulder portion of the passenger sitting on the vehicle seat, and a lower passage portion through which air is blown by the back fan from a second surface portion of the seat back for receiving the waist portion of the passenger, the first surface portion being positioned higher than the second surface portion in the seat back; and the electronic control unit controls the amount of air blown from the second surface portion of the seat back to be smaller than the amount of air blown from the surface of the seat cushion, and to be smaller than an amount of air blown from first surface portion of the seat back.

6. The air conditioner according to claim 5, wherein:

the back fan includes a first fan portion disposed in the upper passage portion for blowing air from the first surface portion of the seat back, and a second fan portion disposed in the lower passage portion for blowing air from the second surface portion of the seat back; and the electronic control unit controls the first fan portion and the second fan portion in such a manner that the amount of air blown from the second surface portion of the seat back is smaller than the amount of air blown from first surface portion of the seat back in the seat cooling operation.

7. The air conditioner according to claim 5, wherein:

the upper passage portion of the back air passage includes a first communication passage communicated with a discharge side of the back fan, and a first distribution passage through which air introduced into the first communication passage is supplied to the first surface portion of the seat back; and the lower passage portion of the back air passage includes a second communication passage communicated with the discharge side of the back fan, and a second distribution passage through which air introduced into the second communication passage is supplied to the second surface portion of the seat back.

8. The air conditioner according to claim 7, further comprising a damper for controlling an opening area of the second communication passage, wherein the electronic control unit controls the damper to reduce the opening area of the second communication passage in the seat cooling operation.

9. An air conditioner for a vehicle, comprising:

an interior air conditioning unit for blowing conditioned air into a passenger compartment of the vehicle from a front portion in the passenger compartment;

a seat air conditioning unit for blowing conditioned air from a vehicle seat that includes a seat cushion for receiving the hip portion of a passenger sitting on the vehicle seat and a seat back for receiving the waist portion and the shoulder portion of the passenger; and an electronic control unit for controlling the interior air conditioning unit and the seat air conditioning unit, the seat air conditioning unit includes:

a cushion air passage provided in the seat cushion, through which air is blown from a surface of the seat cushion toward the hip portion of the passenger on the vehicle seat;

a back air passage provided in the seat back, through which air is blown from a surface of the seat back toward the shoulder portion and the waist portion of the passenger sitting on the vehicle seat;

a cushion fan provided in the seat cushion, for blowing air in the cushion air passage only to the surface of the seat cushion, an air blowing amount from the cushion fan being independently controlled by the electronic control unit; and a back fan provided in the seat back independently from the cushion blower, for blowing air in the back air passage only to the surface of the seat back, an air blowing amount from the back fan being independently controlled by the electronic control unit, wherein:

the electronic control unit controls the cushion fan and the back fan in such a manner that an amount of air blown from the seat back is smaller than an amount of air blown from the seat cushion while the passenger sits on the vehicle seat, after a seat air conditioning operation for blowing cool air from the vehicle seat is selected by the passenger in a cooling operation where the passenger compartment is cooled by interior air conditioning unit.

10. The air conditioner according to claim 9, wherein:

the electronic control unit controls a cooling capacity of the interior air conditioning unit and a cooling capacity of the seat air conditioning unit based on a control value of the interior air conditioning unit and a control value of the seat air conditioning unit, respectively; and the control value of seat air conditioning unit is constructed of a control value of the seat cushion and a control value of the seat back;

the electronic control unit includes a first calculation means for calculating the control value of the interior air conditioning unit based on an air temperature in the passenger compartment and a set air temperature in the passenger compartment set by the passenger, the control value of the interior air conditioning unit being smaller as the cooling capacity of the interior air conditioning unit becomes larger;

a second calculation means for calculating the control value of the seat cushion and the control value of the seat back based on the calculated control value of the interior air conditioning unit and a seat set temperature set by the passenger;

a control-value determination means for determining whether the calculated control value of the seat back is smaller than a predetermined control value; and a change means for changing the control value of the seat back to be equal to or larger than the predetermined control value for reducing the cooling capacity of the seat back, when the control-value determination means determines that the calculated control value of the seat back is smaller than the predetermined control value.

11. The air conditioner according to claim 10, wherein:

the electronic control unit further includes a passing-time determination means for determining whether a predetermined time passes after the seat air conditioning operation is started; and the change means changes the control value of the seat back to be equal to or larger than the predetermined control value for reducing the cooling capacity of the seat back, when the passing-time determination means determines that the predetermined time passes and when the control-value determination means determines that the calculated control value of the seat back is smaller than the predetermined control value.

12. The air conditioner according to claim 9, wherein:

the electronic control unit controls a cooling capacity of the interior air conditioning unit and a cooling capacity of the seat air conditioning unit based on a control value of the interior air conditioning unit and a control value of the seat air conditioning unit, respectively; and the electronic control unit includes:

a first calculation means for calculating the control value of the interior air conditioning unit based on an air temperature in the passenger compartment and a set air temperature in the passenger compartment set by the passenger, the control value of the interior air conditioning unit being smaller as the cooling capacity of the interior air conditioning unit increases;

a second calculation means for calculating the control value of the seat air conditioning unit based on the calculated control value of the interior air conditioning unit and a set seat temperature set by the passenger;

a control-value determination means for determining whether the calculated control value of the seat air conditioning unit is smaller than a predetermined control value; and a change means for changing the control value of the seat air conditioning unit to a value where the cooling capacity of the seat air conditioning unit becomes smaller, when the control-value determination means determines that the calculated control value of the seat air conditioning unit is smaller than the predetermined control value.

13. The air conditioner according to claim 12, wherein:

the electronic control unit has a passing-time determination means for determining whether or not a predetermined time passes after the seat air conditioning operation of the seat air conditioning unit is started; and the change means changes the control value of the seat air conditioning unit to the value where the cooling capacity of the seat air conditioning unit becomes smaller, when the passing-time determination means determines that the predetermined time passes.

14. A vehicle air conditioner including a seat air conditioning unit for a vehicle seat that includes a seat cushion for receiving the hip portion of a passenger sitting on the vehicle seat, and a seat back for receiving the waist portion and the shoulder portion of the passenger, the seat air conditioning unit comprising:

a cushion air blowing means provided in the seat cushion, for blowing air from a surface of the seat cushion toward the hip portion of the passenger on the vehicle seat;

a first back air blowing means provided in the seat back, for blowing air from a first surface of the seat back, receiving the shoulder portion of the passenger sitting on the vehicle seat, a second back air blowing means provided in the seat back for blowing air from a second surface of the seat back, receiving the waist portion of the passenger sitting on the vehicle seat; and a cooling capacity control means for controlling a cooling capacity of air blown from the second back blowing means to be smaller than a cooling capacity of air blown from the first back blowing means while the passenger sits on the vehicle seat, after a seat air conditioning operation for blowing cool air from the vehicle seat is selected.

15. The vehicle air conditioner according to claim 14, wherein the cooling capacity control means controls the cooling capacity of air blown from the second back blowing means to be smaller than the cooling capacity of air blown from the first back blowing means while the passenger sits on the vehicle seat when a predetermined time passes after the seat air conditioning operation is started.

16. The vehicle air conditioner according to claim 14, further comprising a peltier element provided in the seat back, for heating air blown from the second back blowing means and for cooling air blown from the first back blowing means.

17. The vehicle air conditioner according to claim 14, further comprising an interior air conditioning unit capable of cooling air to be blown into a passenger compartment of the vehicle; and an electronic control unit for controlling operation of the interior air conditioning unit, wherein the electronic control unit controls the cooling capacity of the seat air conditioning unit.

18. An air conditioner for a vehicle, comprising:

a seat air conditioning unit for a vehicle seat that includes a seat cushion for receiving the hip portion of a passenger sitting on the vehicle seat, and a seat back for receiving the waist portion and the shoulder portion of the passenger on the vehicle seat; and an electronic control unit for controlling the seat air conditioning unit, the seat air conditioning unit includes:

a cushion fan provided in the seat cushion, for blowing air from the surface of the seat cushion, the cushion fan being independently controlled by the electronic control unit;

a back fan provided in the seat back independently from the cushion blower, for blowing air from the surface of the seat back, the back fan being independently controlled by the electronic control unit;

an upper passage portion provided in the seat back, through which air is blown by the back fan from a first surface portion of the seat back for receiving shoulder portion of the passenger sitting on the vehicle seat; and a lower passage portion provided in the seat back, through which air is blown by the back fan from a second surface portion of the seat back for receiving the waist portion of the passenger, the first surface portion being positioned higher than the second surface portion in the seat back; and the electronic control unit controls the upper passage portion and the lower passage portion in such a manner that an amount of air blown from the second surface portion of the seat back is smaller than the amount of air blown from the surface of the seat cushion, and is smaller than an amount of air blown from first surface portion of the seat back.

* * * * *